United States Patent [19]

Pfeifer et al.

[11] 4,210,743
[45] Jul. 1, 1980

[54] TRANSPARENT POLYAMIDES FROM BRANCHED CHAIN DIAMINES

[75] Inventors: Josef Pfeifer, Therwil; Heinz Peter, Rheinfelden, both of Switzerland

[73] Assignee: Ciba-Geigy Corporation, Ardsley, N.Y.

[21] Appl. No.: 954,809

[22] Filed: Oct. 26, 1978

[30] Foreign Application Priority Data

Oct. 28, 1977 [CH] Switzerland .................. 13149/70

[51] Int. Cl.² .............................................. C08G 69/26
[52] U.S. Cl. ..................................... 528/347; 428/474;
260/33.4 P; 528/336; 528/338; 528/339;
528/340; 528/346; 528/349
[58] Field of Search .................... 528/349, 347, 346

[56] References Cited

U.S. PATENT DOCUMENTS

| | | | |
|---|---|---|---|
| 3,563,959 | 2/1971 | Schade et al. | 528/349 |
| 3,939,147 | 2/1976 | Hugelin et al. | 260/239 BC |

FOREIGN PATENT DOCUMENTS

| | | |
|---|---|---|
| 905475 | 9/1962 | United Kingdom . |
| 948189 | 1/1964 | United Kingdom . |
| 1251520 | 10/1971 | United Kingdom . |
| 1353091 | 5/1974 | United Kingdom . |

OTHER PUBLICATIONS

Chemical Abstracts, vol. 40 (1946), 900³.
Chemical Abstracts, vol. 85 (1976), 79037d.
Chemical Abstracts, vol. 36 (1942), 4720⁴.

*Primary Examiner*—Harold D. Anderson
*Attorney, Agent, or Firm*—Luther A. R. Hall

[57] ABSTRACT

The invention provides transparent polyamides which have a specific viscosity of at least 0.4 dl/g (0.5% in m-cresol at 25° C.). They consist of recurring structural units of the formula I

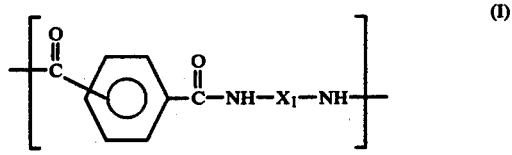

and, as the case may be, of recurring structural units of the formula II

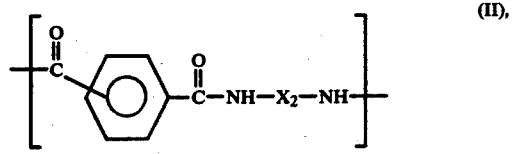

wherein
$X_1$ represents

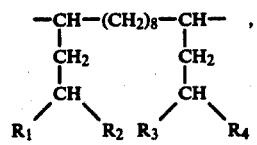

$X_2$ represents

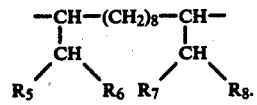

$R_1$ and $R_8$ represent in general alkyl radicals. $R_1$ to $R_3$ can also represent hydrogen, and $R_5$ and $R_6$ and $R_7$ and $R_8$, together with the carbon atom to which they are attached, also represent cycloalkyl. The polyamides are derived in their structure from 100 to 25 mol % of terephthalic acid and from isophthalic acid. The polyamides may contain only up to 75 mol % of structural elements of the formula II. They are suitable for the manufacture of transparent moulded articles.

10 Claims, No Drawings

TRANSPARENT POLYAMIDES FROM BRANCHED CHAIN DIAMINES

The present invention relates to novel transparent polyamides, a process for their production and the use thereof for the manufacture of moulded articles.

German patent specification No. 745,029 describes a process for the production of polyamides of higher molecular weight, wherein primary or secondary aliphatic or aromatic aminocarboxylic acid nitriles, or mixtures of an aliphatic or aromatic dinitrile and approximately equivalent amounts of a primary or secondary diamine, are heated to temperatures of about 150° to 300° C., under pressure, in the presence of water. As suitable diamine, there is mentioned, inter alia, 1,10-diamino-1,10-dimethyldecane. According to French patent specification No. 867,384, formamides, for example N,N-diformyl-1,10-dimethyl-1,10-diaminodecane, can also be used as polycondensation components for the production of polyamides. Finally, German Offenlegungsschrift No. 1,720,513 discloses generically boil-proof transparent polyamides obtained from aromatic dicarboxylic acids and unsubstituted or alkyl-substituted alkyl-enediamines containing containing 1 to 10 carbon atoms in the chain, which are substituted at at least one of the two terminal carbon atoms by an alkyl group of 1 to 4 carbon atoms. The specific disclosure of this Offenlegungsschrift, however, is restricted to transparent polyamides obtained from aromatic dicarboxylic acids and alkylenediamines of the kind mentioned above containing not more than 7 carbon atoms in the chain. Polyamides obtained from aromatic dicarboxylic acids or derivatives thereof and 1,10-dialkyl-substituted 1,10-diaminododecanes are also not specifically described in the other previously mentioned references.

The polyamides obtained from aromatic dicarboxylic acids and derivatives thereof and longer chain, unsubstituted or alkyl-substituted diamines, and which are known from this prior art literature, as well as the condensation product of terephthalic acid and an isomeric mixture of 2,2,4- and 2,4,4-trimethylhexamethylenediamine, known under the registered trade name of "Trogamid T", are not entirely satisfactory as regards water absorption, resistance to hydrolysis and/or dimensional stability under the influence of moisture, whereby the mechanical and electrical properties of these polyamides are also impaired. Furthermore, they quickly lose their transparency in boiling water and the glass transition temperatures of these products are heavily moisture-dependent.

Accordingly, it is the object of the present invention to provide novel transparent and boil-proof polyamides having a lower water absorption, increased resistance to hydrolysis, good dimensional stability under the influence of moisture and correspondingly improved mechanical and, in particular, electrical properties.

The novel polyamides of the invention have a reduced specific viscosity of at least 0.4 dl/g and preferably of 0.4 to about 3 dl/g, and in particular of about 0.6 to about 2 dl/g, determined in a 0.5% solution of the polyamide in m-cresol at 25° C., and consist of recurring structural units of the formula I

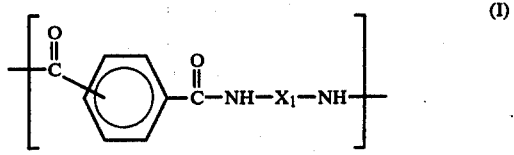

and, where appropriate, of recurring structural units of the formula II

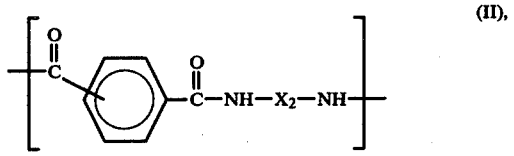

wherein
$X_1$ represents

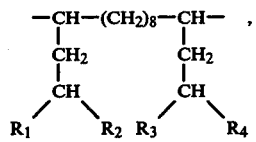

$X_2$ represents

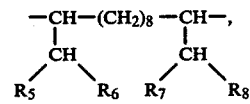

$R_1$ and $R_3$, each independently of the other, represent hydrogen or alkyl of 1 to 4 carbon atoms, $R_2$ and $R_4$, each independently of the other, represent alkyl of 1 to 12 carbon atoms, $R_5$ and $R_7$, each independently of the other, represent alkyl of 1 to 4 carbon atoms, $R_6$ and $R_8$, each independently of the other, represent alkyl of 1 to 10 carbon atoms, or $R_5$ and $R_6$ and/or $R_7$ and $R_8$, together with the carbon atom to which they are attached, represent cycloalkyl of 4 to 12 carbon atoms, and in formulae I and II the carbonyl groups are bonded to the benzene ring in the 1,4-position in an amount of 100 to 25 mol% and in the 1,3-position in an amount of 0 to 75 mol%, in each case based on all benzenedicarboxylic acid groups present, and the diamine components, based on all diamine components present, consist of 100 to 25 mol% of those of the formula $-NH-X_1-NH-$ and of 0 to 75 mol% of those of the formula $-NH-X_2-NH-$, and the amount of diamine components $-NH-X_1-NH-$, expressed in mol%, is less than or equal to the amount of terephthalic acid components.

Alkyl groups represented by $R_1$ to $R_8$ can be straight-chain or branched, but are preferably straight-chain. Examples of alkyl groups as defined herein are: the methyl, ethyl, n-propyl, isopropyl, n-butyl, sec-butyl, n-pentyl, n-hexyl, n-octyl, n-decyl, n-undecyl and n-dodecyl group.

A cycloalkyl ring formed by $R_5$ and $R_6$ or $R_7$ and $R_8$, together with the carbon atoms to which they are attached is for example the cyclopentyl, cyclohexyl, cyclooctyl or cyclododecyl ring.

Each of the pair of groups $R_1$ and $R_3$, $R_2$ and $R_4$, $R_5$ and $R_7$ preferably represent indentical groups, or $R_5$ and $R_6$ and $R_7$ and $R_8$, together with the carbon atoms to which they are attached, each represent identical cycloalkyl groups.

Preferred polyamides are those wherein each of $R_1$ and $R_3$ represents hydrogen and each of $R_2$ and $R_4$ represents alkyl of 1 to 6, and especially 3 to 6, carbon atoms, or each of $R_1$ and $R_3$ represents methyl and each of $R_2$ and $R_4$ represents alkyl of 1 to 6, and especially 2 to 6, carbon atoms, each of $R_5$ and $R_7$ represents alkyl of 1 to 4 carbon atoms and each of $R_6$ and $R_8$ represents alkyl of 1 to 6 carbon atoms, or $R_5$ and $R_6$ and $R_7$ and $R_8$, together with the carbon atoms to which they are attached, each represent cyclopentyl or cyclohexyl.

The most preferred polyamides are those which consist exclusively of recurring structural units of the formula I, wherein each of $R_1$ and $R_3$ represents hydrogen and each of $R_2$ and $R_4$ represents methyl or ethyl and, in particular, n-propyl or n-butyl.

Further preferred polyamides of the invention are the following three special types:
1. Polyamides which consist of recurring structural units of the formula V

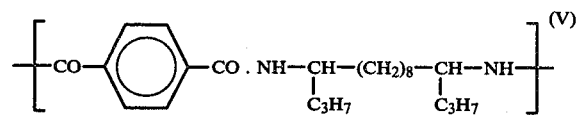

and which have a reduced specific viscosity (0.5% in m-cresol at 25° C.) of preferably about 1 dl/g.
2. Polyamides which consist of recurring structural units of the formula VI

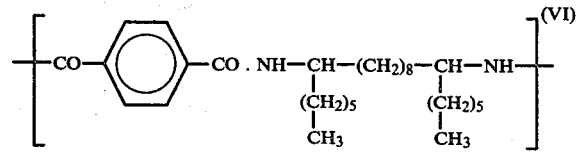

and which have a reduced specific viscosity (0.5% in m-cresol at 25° C.) of preferably about 1 dl/g.
3. Polyamides which consist of recurring structural units of the formula VII

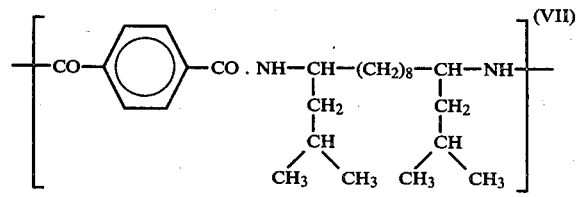

and which have a reduced specific viscosity (0.5% in m-cresol at 25° C.) of preferably about 1 dl/g.

The polyamides of the present invention can be obtained by reacting 100 to 25 mol % of terephthalic acid or of an amide-forming derivative thereof and 0 to 75 mol % of isophthalic acid or of an amide-forming derivative thereof, with 100 to 25 mol % of a diamine of the formula III

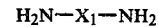

and 0 to 75 mol % of a diamine of the formula IV

wherein $X_1$ and $X_2$ are as defined in formulae I and II, the amount of diamine of the formula III, expressed in mol %, being less than or equal to the amount of terephthalic acid or amide-forming derivative thereof. As amide-forming derivatives of terephthalic acid or isophthalic acid it is possible to use for example the corresponding dihalides, especially the dichlorides, dinitriles, dialkyl or diaryl esters, in particular dialkyl esters containing 1 to 4 carbon atoms in each of the alkyl moieties, and diphenyl esters.

The polyamides of the invention are preferably obtained by the melt polycondensation process in several steps. In this process, the reactants in the given ratios, preferably salts of isophthalic acid and/or terephthalic acid, and diamine of the formula III and optionally salts of isophthalic acid and/or terephthalic acid and diamine of the formula IV, are precondensed under pressure at temperatures between about 220° and 300° C. in the melt, advantageously in an inert gas atmosphere, such as nitrogen. The salts to be used for the precondensation are conveniently prepared individually from substantially stochiometric amounts of isophthalic acid and/or terephthalic acid and diamine of the formula III or isophthalic acid and/or terephthalic acid and diamine of the formula IV in suitable inert organic solvents. Suitable inert organic solvents are for example cycloaliphatic alcohols, such as cyclopentanol and cyclohexanol, and, in particular, aliphatic alcohols containing not more than 6 carbon atoms, such as methanol, ethanol, n-propanol, butanols, pentanols and hexanols, and also mixtures of such solvents with water. The precondensate can subsequently be further condensed at temperatures between about 220° and 300° C. under normal pressure, and advantageously also in an inert gas atmosphere, until the formation of the polyamides. In some cases it can be of advantage to apply a vacuum when the polycondensation is complete, in order to degas the polyamide.

The polyamides of the invention can also be obtained by melt polycondensation of diamines of the formula III and/or IV with substantially stoichiometric amounts of an activated ester of terephthalic acid and, optionally, of isophthalic acid. Suitable activated esters are in particular the corresponding diphenyl esters.

The reaction temperatures are in general in the range between about 230° and 300° C.

Finally, the polyamides of the invention can also be obtained in a manner which is in itself known by solvent or interfacial polycondensation.

The diamines of the formulae III and IV are known or they can be prepared by methods which are in themselves known, for example by catalytic hydrogenation of 1,2-diaza-1,5,9-cyclododecatrienes or 1,2-diazacyclododecanes which are correspondingly substituted in the 3,12-position, in the presence of an inert organic solvent.

The polyamides of the present invention have a crystal clear appearance, are resistant to boiling water and are distinguished in particular by low water absorption, excellent resistance to hydrolysis and/or good dimensional stability under the influence of moisture, allied to improved mechanical and especially electrical properties, such as high glass transition temperatures which are virtually independent of moisture. The polyamides can be processed to transparent moulded articles of the most diverse kind by methods which are in themselves known, for example by injection moulding or extrusion.

The invention is illustrated by the following Examples.

EXAMPLE 1

With stirring, 16.6 g of terephthalic acid in a mixture of 120 ml of water and 400 ml of ethanol are heated to 50° C. in a round-bottom flask equipped with stirrer, drip funnel and reflux cooler. From the drip funnel, 31.26 g of 6,15-diaminoeicosane are added dropwise and the resulting mixture is refluxed until the pH is about 7.5 (time taken: about 8 hours). The reaction mixture is then cooled to 5° C. and the salt which has formed is collected by filtration and dried in vacuo at 80° C.

Yield: 46 g (97% of theory).

15 g of the above salt are fused under nitrogen in a bomb tube and heated to 280° C. After 3 hours, the melt is cooled and the solidified precondensate is removed from the tube and transferred to a condensation tube with a means for introducing nitrogen. The precondensate is fused under nitrogen at 270° C. and kept for 10 hours at this temperature while introducing nitrogen. On cooling, the melt solidifies to a crystal clear mass. The reduced specific viscosity of the resulting polyamide, determined in a 0.5% solution of the polyamide in m-cresol at 25° C., is 0.96 dl/g.

The polyamide is pressed to 3 sheets at 250° C. using an electrically heated hydraulic press. Sheet 1 is kept in the dry state; sheet 2 is kept at room temperature (20°–25° C.) and 65% relative humidity; and sheet 3 is kept under water.

After 1 week, sheet 2 has absorbed 0.4% by weight of water and sheet 3 has absorbed 0.6% by weight of water. No more water is absorbed under the above conditions, even after longer times.

The glass transition temperature of sheets 1 to 3 is determined by differential thermoanalysis after the above described treatment:
sheet 1: 126° C., sheet 2: 114° C., sheet 3: 114° C.

EXAMPLES 2 to 7

Further polyamides obtained from terephthalic acid and diamines as defined herein are produced by the method described in Example 1 and processed to sheets. In Examples 5 to 7, mixtures of two different salts of terephthalic acid and various diamines were used and polycondensed to the corresponding copolyamides. The reaction components employed and the properties of the polyamides obtained therewith, measured as indicated in Example 1, are summarised in Table 1.

EXAMPLE 8

4.183 g of 10,19-diaminooctacosane and 3.071 g of diphenyl terephthalate are kept for 3 hours at 220° C. under nitrogen in a condensation tube equipped with a means for introducing nitrogen. The temperature is then gradually raised to 250° C. After 3 hours a vacuum is applied, and the phenol which is split off is distilled off in the course of 3 hours. On cooling, the melt solidifies to a crystal clear mass. Reduced specific viscosity of the resulting polyamide, determined in a 0.5% solution of the polyamide in m-cresol at 25° C.: 0.53 dl/g.

Glass transition temperature: 112° C.

Water absorption at 65% relative humidity and room temperature after 1 week: 0.3% by weight.

EXAMPLE 9

Diphenyl terephthalate is reacted with 12,21-diaminodotriacontane in the manner described in Example 8. The properties of the resulting polyamide are virtually identical with those of the polyamide prepared in Example 8.

EXAMPLE 10

Diphenyl terephthalate is reacted with a stoichiometric amount of 4,13-diamino-2,15-dimethylhexadecane in the manner described in Example 8. The properties of the resulting polyamide are reported in Table 1.

EXAMPLE 11

11.72 g of terephthalic acid in a mixture of 250 ml of ethanol and 90 ml of water are heated to reflux temperature in a reaction vessel equipped with stirrer, reflux cooler and drip funnel, and then 25 g of 1,10-diamino-1,10-dicyclohexyldecane are added dropwise from the drip funnel. The reaction mixture is stirred for 48 hours under reflux, then cooled to room temperature (20°–25° C.). The resulting salt is collected by filtration and dried in vacuo at 100° C. Yield: 34.8 (98% of theory). 7.5 g of this salt and 7.5 g of the salt of terephthalic acid and 4,13-diaminohexadecane (prepared according to Example 2) are mixed and fused under nitrogen in a bomb tube. The salt mixture is fused at 280° C. and kept for 3 hours at this temperature. The cooled precondensate is then transferred to a condensation tube and polycondensed for 5 hours in the melt at 280° C. while continually introducing nitrogen. On cooling, the copolyamide solidifies to a crystal clear mass. The copolyamide is processed in a hydraulic press at 280° C. to sheets about 0.2 mm thick. The properties of the copolyamide are reported in Table 1.

EXAMPLE 12

In the same manner as described in Example 11, 7 g of the salt obtained according to paragraph 1 therein and 3 g of the salt of terephthalic acid and 7,16-diaminodocosane (prepared according to Example 4) are polycondensed and pressed to sheets. The properties of the resulting copolyamide are reported in Table 1.

EXAMPLE 13

11.83 g of 3,12-diamino-2,13-dimethyltetradecane are dissolved in 150 ml of ethanol in a beaker equipped with a stirrer and the solution is heated to 50° C. To this solution are added, in one portion, 7.66 g of isophthalic acid, and the beaker is rinsed with 30 ml of ethanol. A solution is formed with attendant exothermic reaction. On cooling, the salt precipitates from the reaction mixture. It is collected by filtration and dried in vacuo at 90° C. Yield: 15.8 g (81% of theory).

3 g of this salt and 7 g of the salt of terephthalic acid and 5,14-diaminooctadecane (prepared according to Example 3) are mixed and precondensed for 3 hours at 270° C. in a bomb tube. Polycondensation is carried out in a condensation tube for 7 hours at 270° C. while introducing nitrogen. The resulting crystal clear mass is pressed to sheets in a hydraulic press at 270° C. The properties of the copolyamide are reported in Table 1.

EXAMPLE 14 in Example 13. The properties of the copolyamide are reported in Table 1.

Table 1

| Example | salt 1 (% by weight) salt 2 (% by weight) | water absorption % by weight (1) | | glass transition temperature in 0° C. (at 2) | | | reduced specific viscosity (3) |
|---|---|---|---|---|---|---|---|
| | | at 65% rel. humidity | under water | dry | at 65% rel. humidity | under water | |
| 2 | TPA/4,13-diaminohexadecane (100) | 0.9 | 1.4 | 136 | 122 | 113 | 1.08 |
| 3 | TPA/5,14-diaminooctadecane (100) | 0.6 | 0.9 | 129 | 121 | 120 | 1.03 |
| 4 | TPA/7,16-diaminodocosane (100) | 0.3 | 0.5 | 118 | 113 | 113 | 0.81 |
| 5 | TPA/4,13-diaminohexadecane (50) TPA/7,16-diaminodocosane (50) | 0.5 | 0.8 | 126 | 115 | 111 | 0.86 |
| 6 | TPA/4,13-diaminohexadecane (50) TPA/6,15-diaminoeicosane (50) | 0.7 | 1.0 | 131 | 118 | 112 | 0.92 |
| 7 | TPA/4,13-diaminohexadecane (50) TPA/5,14-diaminooctadecane (50) | 0.8 | 1.2 | 136 | 123 | 113 | 0.98 |
| 10 | TPA/4,13-diamino-2,15-dimethylhexadecane (100) | 0.7 | 1.0 | 154 | 140 | 134 | 1.06 |
| 11 | TPA/1,10-diamino-1,10-dicyclohexyldecane (50) TPA/4,13-diaminohexadecane (50) | 0.9 | 1.5 | 154 | 134 | 128 | 0.81 |
| 12 | TPA/1,10-diamino-1,10-dicyclohexyldecane (70) TPA/7,16-diaminodocosane (30) | 0.6 | 0.9 | 149 | 138 | 134 | 0.60 |
| 13 | TPA/5,14-diaminooctadecane (70) IPA/3,12-diamino-2,13-dimethyltetradecane (30) | 0.8 | 1.3 | 130 | 115 | 108 | 0.95 |
| 14 | TPA/6,15-diaminoeicosane (50) IPA/1,10-diamino-1,10-dicyclohexyldecane (50) | 0.6 | 1.0 | 139 | 127 | 113 | 0.67 |
| 15 | TPA/5,14-diaminooctadecane (40) TPA/5,14-(diamino-4,15-dimethyloctadecane (60) | 0.5 | 0.8 | 145 | 134 | 124 | 0.96 |
| Comparison Examples | | | | | | | |
| (a) | TPA/2,2,4-trimethylhexamethylenediamine/2,4,4-trimethylhexamethylenediamine (100) | 2.0 | 3.3 | 150 | 108 | 98 | 1.15 |
| (b) | TPA/2,11-diaminododecane (100) | 1.7 | 2.9 | 146 | 118 | 105 | 1.33 |

(1) water absorption after storage for 1 week
(2) glass transition temperature after storage for 1 week
(3) dl/g; reduced specific viscosity, 0.5% solution in m-cresol at 25° C.
TPA = terephthalic acid
IPA = isophthalic acid 12.27 g of isophthalic acid are dissolved in 380 ml of boiling ethanol. Then 25 g of 1,10-diamino-1,10-dicyclohexyldecane are added in one portion and then further 75 ml of ethanol are added. The salt precipitates after a few seconds. The reaction mixture is cooled to 0° C. and the salt is collected by filtration and dried in vacuo at 100° C. Yield: 36.1 g (97% of theory).

A mixture of 5 g of this salt and 5 g of the salt of terephthalic acid and 6,15-diaminoeicosane (prepared according to Example 1) is polycondensed to a copolyamide under the conditions indicated in Example 13 and then processed to transparent sheets. The properties of the resulting copolyamide are reported in Table 1.

EXAMPLE 15

In a reaction vessel equipped with stirrer, reflux cooler and drip funnel, 13.98 g of terephthalic acid in a mixture of 100 ml of water and 340 ml of ethanol are heated to 60° C., and then 26.3 g of 5,14-diamino-4,15-dimethyloctadecane are added. The suspension is stirred under reflux until the pH is about 7.5 (about 8 hours). After cooling to room temperature, the salt is collected by filtration and dried in vacuo at 90° C. Yield: 38.3 g (95% of theory).

6 g of this salt are mixed with 4 g of the salt of terephthalic acid and 5,14-diaminooctadecane (prepared according to Example 13) and the mixture is polycondensed to a copolyamide under the conditions indicated in Example 13. The properties of the copolyamide are reported in Table 1.

The diamines used in Example 1 to 15 can be obtained as follows:

(a) 4,13-Diaminohexadecane 942 g (3.79 moles) of 3,12-dipropyl-1,2-diaza-1,5,9-cyclododecatriene (diastereoisomer mixture) are dissolved in a stirred autoclave in 3800 ml of tert-butanol. After addition of 90 g of a rhodium/alumina catalyst (5% by weight), hydrogen is introduced up to a pressure of 130–150 bar and hydrogenation is effected at 150°–180° C. until the uptake of hydrogen is complete. After cooling, excess hydrogen is blown off, the suspension is sucked from the autoclave and the catalyst is collected by suction over a small amount of hyflo (filter aid). The filtrate is concentrated by rotary evaporation and the product is purified by distillation, yielding as main fraction 462 g (48% of theory) of 4,13-diaminohexadecane as a colourless oil [b.p. 132°–135° C./0.01 torr; $n_D^{20}$ 1.4590; IR spectrum (liquid) includes bands at 3278 and 1613 cm$^{-1}$].

(b) 5,14-Diaminooctadecane

The procedure described in a) is repeated, starting from 208 g (0.75 mole) of 3,12-dibutyl-1,2-diaza-1,5,9-cyclododecatriene (diastereoisomer mixture) and using correspondingly reduced amounts of catalyst and solvent. The main fraction consists of 132.8 g (62.3% of theory) of 5,14-diaminooctadecane as a colourless oil

[b.p. 149° C./0.001 torr; $n_D^{20}=1.4593$; IR spectrum (liquid) includes bands at 333, 3267, 1613 cm$^{-1}$].

(c) 6,15-Diaminoeicosane

The procedure described in a) is repeated, starting from 220 g (0.71 mole) of 3,12-dipentyl-1,2-diazacyclododecane (diastereoisomer mixture) and using correspondingly reduced amounts of catalyst and solvent. The main fraction consists of 136 g (61.3% of theory) and 6,15-diaminoeicosane as a colourless oil [b.p. 167°-170° C./0.001 torr; $n_D^{20}=1.4603$; IR spectrum (liquid) includes bands at 3289, 1613 cm$^{-1}$].

(d) 7,16-Diaminodocosane

The procedure described in a) is repeated, starting from 190 g (0.56 mole) of 3,12-dihexyl-1,2-diazacyclododecane (diastereoisomer mixture) and using correspondingly reduced amounts of catalyst and solvent. The main fraction consists of 130 g (68% of theory) of 7,16-diaminodocosane as a colourless oil [b.p. 184° C./0.02-0.005 torr; $n_D^{20}=1.4624$; IR spectrum (liquid) includes bands at 3355, 3278, 1613 cm$^{-1}$].

(e) 10,19-Diaminooctacosane

The procedure described in a) is repeated, starting from 100 g (0.24 mole) of crude 3,12-dinonyl-1,2-diaza-1,5,9-cyclododecatriene (diastereoisomer mixture) and using correspondingly reduced amounts of catalyst and solvent. Yield: 40.4 g (40% of theory) of 10,19-diaminooctacosane [m.p. 33°-37° C.; IR spectrum includes bands at 3225, 1582 cm$^{-1}$].

(f) 12,21-Diaminodotriacontane

The procedure described in a) is repeated, starting from 100 g (0.21 mole) of crude 3,12-diundecyl-1,2-diaza-1,5,9-cyclododecatriene (diastereoisomer mixture) and using correspondingly reduced amounts of catalyst and solvent. Yield: 64.3 g (64% of theory) of 12,21-diaminodotriacontane [m.p. 45°-46° C.; IR spectrum (CH$_2$Cl$_2$) includes bands at 3174, 1582 cm$^{-1}$].

(g) 3,12-Diamino-2,13-dimethyltetradecane

The procedure described in a) is repeated, starting from 250 g (1 mole) of 3,12-diisopropyl-1,5,9-cyclododecatriene (diastereoisomer mixture) and using correspondingly reduced amounts of catalyst and solvent. The main fraction consists of 238 g (92% of theory) of 3,12-diamino-2,13-dimethyltetradecane as a colourless oil [b.p. 106°-109° C./0.0.1 torr; $n_D^{20}=1.4600$; IR spectrum (liquid) includes bands at 3355, 3278, 1613 (m$^{-1}$].

(h) 5,14-Diamino-4,15-dimethyloctadecane

The procedure described in a) is repeated, starting from 61 g (0.2 mole) of 3,12-di-(2-pentyl)-1,2-diaza-1,5,9-cyclododecatriene (diastereoisomer mixture) and using correspondingly reduced amounts of catalyst and solvent. The main fraction consists of 48.4 g (77% of theory) of 5,14-diamino-4,15-dimethyloctadecane as colourless oil [b.p. 155°-159° C./0.03 torr; $n_D^{20}=1.4632$; IR spectrum (liquid) includes bands at 3246, 1613 cm$^{-1}$].

(i) 1,10-Diamino-1,10-dicyclohexyldecane

The procedure described in a) is repeated, starting from 328.5 g (1 mole) of 3,12-dicyclohexyl-1,2-diaza-1,5,9-cyclododecatriene (diastereoisomer mixture) and using correspondingly reduced amounts of catalyst and solvent. The main fraction obtained consists of 304 g (90% of theory) of 1,10-diamino-1,10-dicyclohexyldecane as a colourless oil [b.p. 190°-193° C./0.05 torr; $n_D^{20}=1.4944$; IR spectrum (liquid) includes bands at 3355, 3278, 1613 cm$^{-1}$].

(k) 4,13-Diamino-2,15-dimethylhexadecane

The procedure described in a) is repeated, starting from 400 g (1.45 moles) of 3,12-diisobutyl-1,2-diaza-1,5,9-cyclododecatriene (diastereoisomer mixture) and using correspondingly reduced amounts of catalyst and solvent. The main fraction obtained consists of 261 g (63% of theory) of 4,13-diamino-2,15-dimethylhexadecane as a colourless oil [b.p. 168°-172° C./0.04 torr; $n_D^{20}=1.4561$; IR spectrum (liquid) includes bands at 3289, 3205, 1600 cm$^{-1}$]. The 1,2-diaza-1,5,9-cyclododecatrienes and 1,2-diazacyclododecanes used as starting materials can be obtained by the methods described in German Offenlegungsschrift No. 2,330,087 and 2,549,403.

What is claimed is:

1. A transparent polyamide having a reduced specific viscosity of 0.4 to about 3 dl/g, determined in a 0.5% solution of the polyamide in m-cresol at 25° C., and which consists of recurring structural units of the formula I

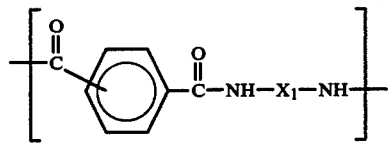

and of recurring structural units of the formula II

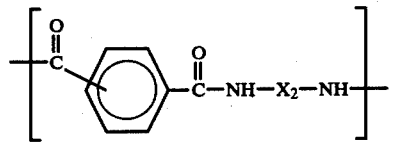

wherein
X$_1$ represents

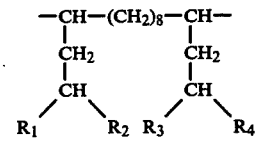

X$_2$ represents

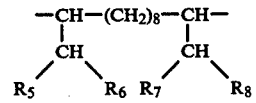

R$_1$ and R$_3$, each independently of the other, represent hydrogen or alkyl of 1 to 4 atoms, R$_2$ and R$_4$, each independently of the other, represent alkyl of 1 to 12 carbon atoms, R$_5$ and R$_7$, each independently of the other, represent alkyl of 1 to 4 carbon atoms, $R_6$ and $R_8$, each independently of the other, represent alkyl of 1 to 10 carbon atoms, or $R_5$ and $R_6$, and $R_7$ and $R_8$, each pair independently of the other pair, together with the carbon atom to which they are attached, represent cycloalkyl of 4 to 12 carbon atoms, and in formula I and II the carbonyl groups are bonded to the benzene ring in the 1,4-position in an amount of 100 to 25 mol% and in the 1,3-position in an amount of 0 to 75 mol%, in each case based on all benzenedicarboxylic acid groups present, and the diamine components, based on all diamine components present, consist of 100 to 25 mol% of those of the formula $-NH-X_1-NH-$ and of 0 to 75 mol% of those of the formula $-NH-X_2-NH-$, and the amount of diamine components $-NH-X_1-NH-$, expressed in mol%, is less than or equal to the amount of terephthalic acid components.

2. A polyamide according to claim 1 wherein each of the pair of substituents $R_1$ and $R_3$, $R_2$ and $R_4$, $R_5$ and $R_7$ and $R_6$ and $R_8$ represents identical groups, or wherein $R_5$ and $R_6$ and also $R_7$ and $R_8$, together with the carbon atom to which they are attached, forms identical cycloalkyl groups.

3. A polyamide according to claim 1 wherein each of $R_1$ and $R_3$ represents hydrogen, and each of $R_2$ and $R_4$ represents alkyl of 1 to 6 carbon atoms, or each of $R_1$ and $R_3$ represents methyl and each of $R_2$ and $R_4$ represents alkyl of 1 to 6 carbon atoms, each of $R_5$ and $R_7$ represents alkyl of 1 to 4 carbon atoms and each of $R_6$ and $R_8$ represents alkyl of 1 to 6 carbon atoms, or $R_5$ and $R_6$ and also $R_7$ and $R_8$, together with the carbon atom to which they are attached, represent cyclopentyl or cyclohexyl.

4. A polyamide according to claim 3 wherein each of $R_1$ and $R_3$ represents hydrogen, and each of $R_2$ and $R_4$ represents alkyl of 3 to 6 carbon atoms; or each of $R_1$ and $R_3$ represents methyl and each of $R_2$ and $R_4$ represents alkyl of 2 to 6 carbon atoms.

5. A polyamide according to claim 1 which consists exclusively of recurring structural units of the formula I, wherein each of $R_1$ and $R_3$ represents hydrogen and each of $R_2$ and $R_4$ represents methyl, ethyl, n-propyl or n-butyl.

6. A polyamide according to claim 5 wherein each of $R_2$ and $R_4$ represents n-propyl or n-butyl.

7. A polyamide according to claim 1 which consists of recurring structural units of the formula V

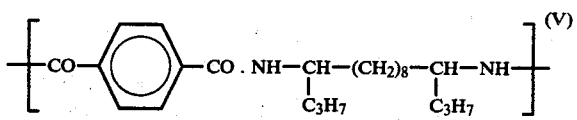

and has a reduced specific viscosity of about 1 dl/g.

8. A polyamide according to claim 1 which consists of recurring structural units of the formula VI

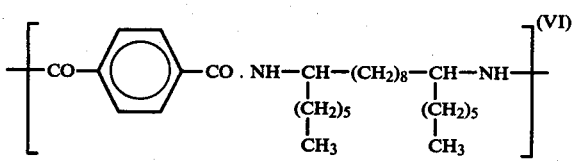

and has a reduced specific viscosity of about 1 dl/g.

9. A polyamide according to claim 1 which consists of recurring structural units of the formula VII

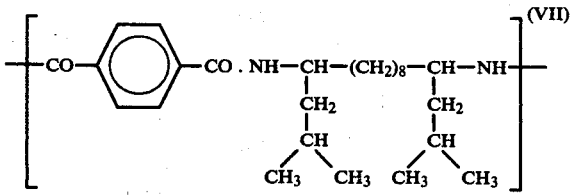

and has a reduced specific viscosity of about 1 dl/g.

10. A molded article of the polyamide according to claim 1.